United States Patent [19]

Itoh

[11] Patent Number: 4,539,606

[45] Date of Patent: Sep. 3, 1985

[54] MAGNETIC REPRODUCING APPARATUS HAVING A CAPSTAN SERVO CIRCUIT

[75] Inventor: Kenji Itoh, Yokohama, Japan

[73] Assignee: Victor Company of Japan Ltd., Yokohama, Japan

[21] Appl. No.: 554,594

[22] Filed: Nov. 23, 1983

[30] Foreign Application Priority Data

Nov. 26, 1982 [JP] Japan .................................. 57-207029

[51] Int. Cl.³ .............................................. G11B 5/008
[52] U.S. Cl. ...................................... 360/70; 360/10.3
[58] Field of Search ........................... 360/10.3, 70, 73

[56] References Cited

U.S. PATENT DOCUMENTS

| | | | |
|---|---|---|---|
| 3,663,764 | 5/1972 | Trost et al. | 360/70 |
| 4,127,881 | 11/1978 | Wakami et al. | 360/70 |
| 4,167,023 | 9/1979 | Bessette et al. | 358/127 |
| 4,486,794 | 12/1984 | Itoh | 360/70 |

Primary Examiner—George G. Stellar
Attorney, Agent, or Firm—Roberts, Spiecens & Cohen

[57] ABSTRACT

A magnetic reproducing apparatus having a capstan servo circuit, comprises rotary heads for reproducing a recorded video signal from tracks which are formed obliquely to the longitudinal direction of a magnetic tape, a drum motor for rotating the rotary heads, and a capstan motor for rotating a capstan which drives the magnetic tape to travel. The capstan servo circuit comprises a detecting circuit for detecting a rotation of the rotary heads, and for producing a detection signal which is in accordance with the rotation of the rotary heads, a reference signal generator for generating a reference signal, a synchronizing circuit for synchronizing the phase of the reference signal from the reference signal generator and the phase of the detection signal from the detecting circuit during a high-speed reproducing mode of the reproducing apparatus, a control head for reproducing a recorded control signal from the magnetic tape, a phase comparator for comparing the phase of the control signal which is reproduced by the control head and the phase of the reference signal from the reference signal generator, and a control circuit for controlling a rotation of the capstan motor by an output signal of the phase comparator.

6 Claims, 13 Drawing Figures

MAGNETIC REPRODUCING APPARATUS HAVING A CAPSTAN SERVO CIRCUIT

BACKGROUND OF THE INVENTION

The present invention generally relates to magnetic reproducing apparatuses having a capstan servo circuit, and more particularly to a magnetic reproducing apparatus having a capstan servo circuit which controls the rotation of a capstan so that noise bar in a reproduced picture appears at a constant position on the reproduced picture and will not move during a high-speed reproducing mode in which a video signal is reproduced from a magnetic tape which travels at a tape speed which is higher than the tape speed upon recording.

In a magnetic recording and reproducing apparatus which records and reproduces a video signal onto and from tracks which are formed obliquely on a magnetic tape with respect to the longitudinal direction of the magnetic tape, recording positions of a vertical synchronizing signal of the video signal must be aligned at end parts of the oblique and parallel recording tracks upon recording. On the other hand, upon reproduction, rotary heads must accurately scan over the above recording tracks. Hence, in this type of a so-called helical scan type magnetic recording and reproducing apparatus (hereinafter simply referred to as a magnetic recording and reproducing apparatus), a head servo circuit and a capstan servo circuit are generally provided. The head servo circuit comprises a speed control loop for controlling the rotational speed of the rotary heads, and a phase control loop for controlling the rotational phase of the rotary heads. The capstan servo circuit controls the rotational speed and the rotational phase of a capstan which drives the tape to travel.

During a normal reproducing mode of the magnetic recording and reproducing apparatus of the above type, the rotational phase of the rotary heads is synchronized to a reference signal by a phase error signal. This phase error signal is obtained by comparing the phase of a detection signal which is detected in accordance with the rotation of the rotary heads by the phase control loop of the head servo circuit, with the phase of the reference signal. Further, the rotational phase of the capstan is synchronized to the above reference signal by another phase error signal. This other phase error signal is obtained by comparing the phase of a control pulse which is reproduced by a phase control loop of the capstan servo circuit, with the phase of the reference signal. Accordingly, the phase of the reproduced control pulse, that is, the rotational phase of a capstan motor, is in synchronism with the rotational phase of the rotary heads.

On the other hand, a high-speed search reproduction can be performed in the above magnetic recording and reproducing apparatus, to search for a predetermined recording position on the magnetic tape. During the high-speed search reproducing mode, the magnetic tape travels in the same direction as upon recording (forward direction), or in a reverse direction, at a high speed which is in the order of seven times the tape speed during the normal reproducing mode, for example. Because the magnetic tape travels at a high speed in the forward or reverse direction during the high-speed search reproducing mode as described above, the relative scanning linear speed between the rotary heads and the magnetic tape during the high-speed search reproducing mode is different from the relative scanning linear speed during the normal reproducing mode. Accordingly, the horizontal scanning frequency of the reproduced video signal during the high-speed search reproducing mode, is different from the regular horizontal scanning frequency of the reproduced video signal during the normal reproducing mode. Thus, if the reproduced signal obtained during the high-speed search reproducing mode is supplied to a television receiver, the reproduced picture will be out of horizontal synchronism, and a regular reproduced picture cannot be obtained.

Therefore, in order to obtain a reproduced picture which is in horizontal synchronism even during the high-speed search reproducing mode, it becomes necessary to carry out reproduction so that the horizontal scanning frequency of the reproduced video signal becomes the same as the horizontal scanning frequency during the normal reproducing mode (15.734 kHz when the video signal is an NTSC system color video signal, for example). In order to achieve this, the rotational speed of the rotary heads must be increased or decreased during the high-speed search reproducing mode, as compared to the rotational speed of the rotary heads during the normal reproducing mode, according to the direction of the tape travel. That is, if the tape traveling direction during the high-speed search reproducing mode is the same as the tape traveling direction (forward direction) during the normal reproducing mode, the rotary heads must be rotated at a rotational speed which is higher than the rotational speed of the rotary heads during the normal reproducing mode. On the other hand, if the tape traveling direction is in the reverse direction during the high-speed search reproducing mode, the rotary heads must be rotated at a rotational speed which is lower than the rotational speed of the rotary heads during the normal reproducing mode. Hence, in the head servo circuit described before, the phase control loop is cut off during the high-speed search reproducing mode, and moreover, a voltage obtained by subjecting the horizontal scanning frequency of the horizontal synchronizing signal to a frequency-to-voltage conversion, is applied to a motor (hereinafter referred to as a drum motor) for rotating the rotary heads. Hence, the rotational speed of the rotary heads is controlled so that the relative scanning linear speed between the rotary heads and the magnetic tape during the high-speed search reproducing mode is the same as the relative scanning linear speed during the normal reproducing mode.

However, because the phase control loop of the head servo circuit is cut off during the high-speed search reproducing mode, the rotation of a drum motor, that is, the rotation of the rotary heads, is out of phase with the reference signal which is obtained from a reference oscillator during this mode. On the other hand, the capstan motor is rotated at a high speed, in phase with the reference signal, during the high-speed search reproducing mode. Hence, the control pulse reproduced from the magnetic tape which is driven to travel by the capstan, and the rotation of the rotary heads, become out of phase during the high-speed search reproducing mode.

On the other hand, during the high-speed search reproducing mode, scanning loci of the rotary heads on the magnetic tape deviate from the recorded tracks, because the magnetic tape travels at a high speed during this mode. Thus, the rotary heads successively scan obliquely across the adjacent tracks. For this reason, if a guard band is formed between the adjacent tracks, noise is generated as the rotary head scans across this guard band. If the adjacent tracks are formed contiguously by two rotary heads which have gaps of mutually different azimuth angles, noise is generated as the rotary head scans over the track which was recorded by a head having a gap of a different azimuth angle. The generated noise appears as noise bar on the reproduced picture.

However, as described before, the rotation of the capstan motor and the rotation of the drum motor are out of phase during the high-speed search reproducing mode. Thus, the position where the rotary head scans across the guard band, and the position where the rotary head scans across the track which was recorded by the head having the gap of the different azimuth angle, respectively are not constant. Therefore, the position on the reproduced picture where the noise bar appears, is not constant and moves upward or downward. This upwardly or downwardly moving noise bar on the reproduced picture is irritating to the eyes of the viewer, and there was a problem in that the reproduced picture obtained during the high-speed search reproducing mode was unpleasant to watch.

Accordingly, in order to eliminate the above problem, a system may be devised for making the rotation of the rotary heads and the rotation of the capstan motor in phase with each other, by directly comparing the phase of the detection signal which is detected in accordance with the rotation of the rotary heads in the head servo circuit, with the phase of the control pulse which is reproduced in the capstan servo circuit. However, in this devisable system, the circuit construction becomes different for the normal reproducing mode and for the high-speed reproducing mode. Thus, this devisable system is disadvantageous in that a large number of switching circuits are required, and the circuit construction becomes complex. On the other hand, another system may be devised for making the rotation of the rotary heads and the rotation of the capstan motor in phase with each other, by directly comparing the phase of the detection signal which is detected in accordance with the rotation of the rotary heads in the head servo circuit, with the phase of the control pulse which is reproduced in the capstan servo circuit, even during the normal reproducing mode so as to simplify the circuit construction. However, according to this latter devisable system, the unstable rotation of the rotary heads during the normal reproducing mode will give undesirable effects on the capstan servo circuit, and there is a disadvantage in that the rotation of the capstan motor will become unstable.

SUMMARY OF THE INVENTION

Accordingly, it is a general object of the present invention to provide a novel and useful magnetic reproducing apparatus having a capstan servo circuit, in which the above described problems and disadvantages have been eliminated.

Another and more specific object of the present invention is to provide a magnetic reproducing apparatus having a capstan servo circuit which is designed to make the rotation of a capstan motor, and a reference signal which is synchronized with a rotation detection error signal which is in accordance with the rotation of a drum motor, in phase with each other, by cutting off supply of the rotation detection error signal to the drum motor and making the reference signal in phase with the rotation detection error signal during a high-speed reproducing mode. According to the capstan servo circuit in the apparatus of the present invention, the rotation of the drum motor and the rotation of the capstan motor are perfectly in phase not only during a normal reproducing mode, but also during the high-speed reproducing mode. As a result, noise bar which is generated in a reproduced picture during the high-speed reproducing mode, is fixed to a constant position on the reproduced picture and will not move upward or downward, and the reproduced picture is not irritating to the eyes of the viewer.

Other objects and further features of the present invention will be apparent from the following detailed description when read in conjunction with the accompanying drawings.

DETAILED DESCRIPTION

Figure 1:
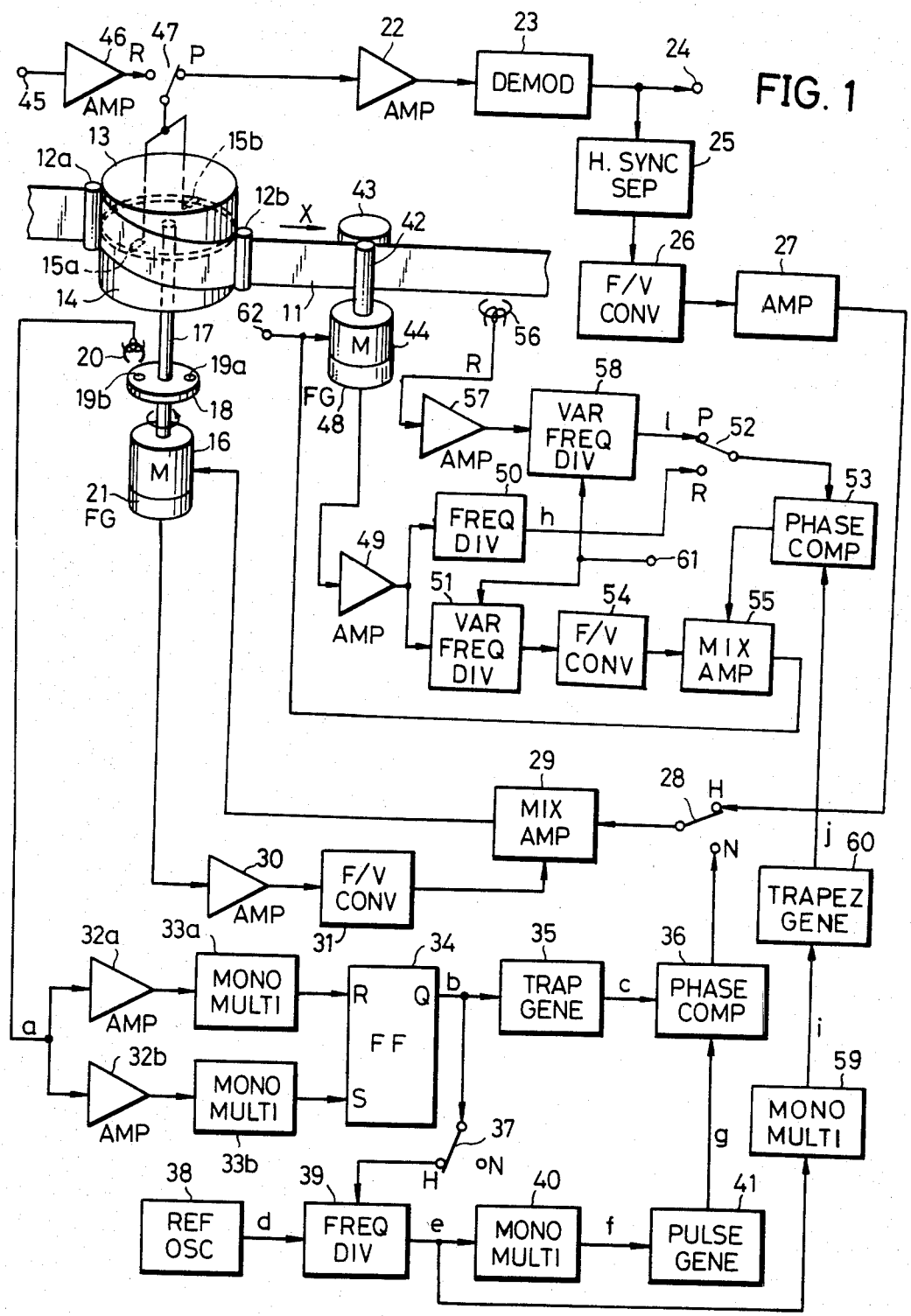
FIG. 1 is a systematic block diagram showing an embodiment of a capstan servo circuit in a magnetic reproducing apparatus according to the present invention.

In FIG. 1, a magnetic tape 11 is guided by guide poles 12a and 12b, and wrapped obliquely around peripheral surfaces of a rotary drum 13 and a stationary drum 14, over an angular range which is slightly larger than 180°. This magnetic tape 11 is pinched between a capstan 42 and a pinch roller 43, and caused to travel in the direction of an arrow X during a normal reproducing mode due to the rotation of the capstan 42 which is rotated by a capstan motor 44. For example, a frequency-modulated video signal is recorded on tracks formed obliquely with respect to the longitudinal direction of the magnetic tape 11. In addition, a control pulse having a constant period is recorded on a control track formed at a predetermined position along the longitudinal direction of the magnetic tape 11. One field of video signal is recorded on each of the oblique tracks on the magnetic tape 11. Rotary heads 15a and 15b are mounted on the rotary drum 13 opposing each other along the diametral direction of the rotary drum 13. The rotary heads 15a and 15b alternately scan over the oblique tracks on the magnetic tape 11.

A drum motor 16 is a D.C. motor which rotates at a rotational speed of 1800 rpm during a recording mode and the normal reproducing mode. A rotary shaft 17 of this drum motor 16 passes through a center part of the stationary drum 14, and is coaxially fixed at a center part of the rotary drum 13. A disc 18 is fixed at a part of the rotary shaft 17, in a state where the rotary shaft 17 passes through a center part of the disc 18. When the drum motor 16 rotates, the rotary drum 13 and the disc 18 rotate unitarily. Magnets 19a and 19b are respectively provided on the disc 18, at mutually opposing positions along the diametral direction of the disc 18. The rotational phase of the drum motor 16, is detected by a pickup head 20 and the magnets 19a and 19b. Phase detection signals of mutually different polarities are alternately and respectively obtained from the pickup head 20.

First, description will be given with respect to the operation of the block system shown in FIG. 1 during the recording mode. During the recording mode, switches 28 and 37 are respectively connected to contacts N, and switches 47 and 52 are respectively connected to contacts R. A frequency generator 21 is provided in the drum motor 16, and a signal having a frequency which is in accordance with the rotational speed of the drum motor 16, is obtained from the frequency generator 21. This output signal of the frequency generator 21 is supplied to a frequency-to-voltage (F/V) converter 31 through an amplifier 30, and converted into a voltage which is in accordance with the frequency of the above output signal. An output voltage of the F/V converter 31 is then supplied to a mixing amplifier 29.

Figure 2:
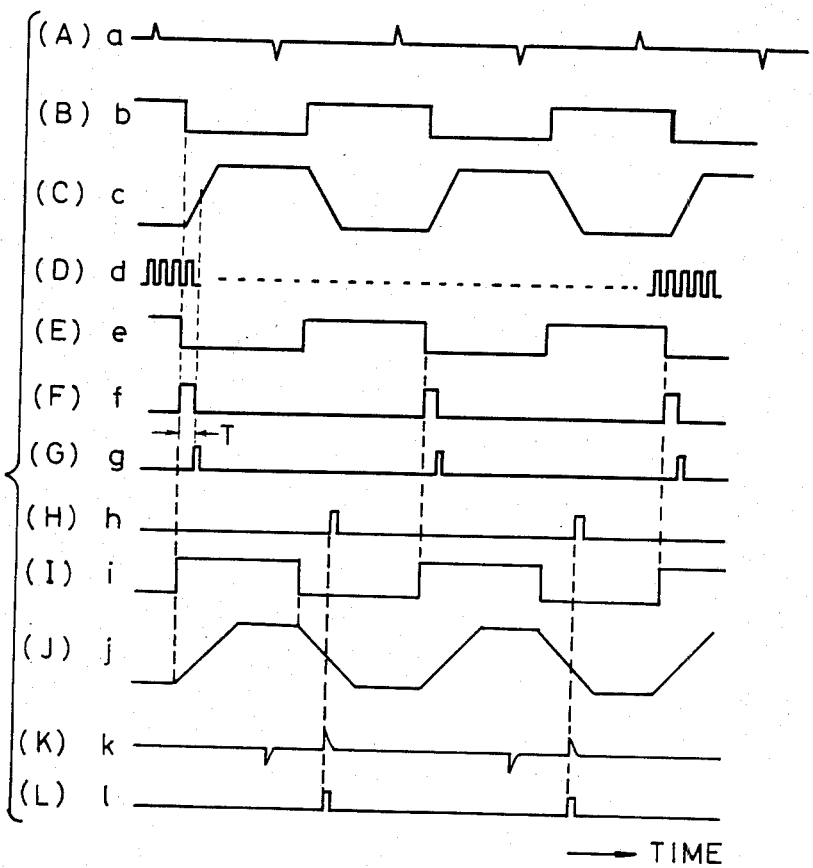
FIGS. 2(A) through 2(L) are graphs respectively showing signal waveform at each part of the block system shown in FIG. 1.

A phase detection signal a shown in FIG. 2(A) which is detected by the pickup head 20, is supplied to monostable multivibrators 33a and 33b through respective amplifiers 32a and 32b, and delayed by predetermined time periods. Output signals of the monostable multivibrators 33a and 33b are respectively applied to a reset terminal R and a set terminal S of a reset-and-set (R-S) flip-flop 34, to successively reverse the stable state of the flip-flop 34. Thus, a square wave signal b shown in FIG. 2(B) is produced from the flip-flop 34. The inverting period of the square wave signal b corresponds to each track scanning period of the rotary heads 15a and 15b.

The above square wave signal b is also supplied to a trapezoidal wave generator 35. A trapezoidal wave c shown in FIG. 2(C) is hence produced from the trapezoidal wave generator 35 and supplied to a phase comparator (sample-and-hold circuit) 36.

A reference signal d shown in FIG. 2(D) having a frequency of 32 kHz, for example, is obtained from a reference signal oscillator 38. This reference signal d is frequency-divided into a signal having a frequency of 30 Hz in a frequency divider 39. A frequency-divided signal e shown in FIG. 2(E) is produced from the frequency divider 39.

The above frequency-divided signal e is supplied to monostable multivibrators 40 and 59 and delayed by predetermined time periods. Thus, a signal f shown in FIG. 2(F) which is delayed by a predetermined time period T, is produced from the monostable multivibrator 40. The monostable multivibrator 59 produces a signal i shown in FIG. 2(I). The signal f is supplied to a pulse generator 41 which generates a sampling pulse g shown in FIG. 2(G) at a leading edge of the signal f. The above sampling pulse g is supplied to the phase comparator 36, to sample the voltage at a sloping part of the trapezoidal wave c which is produced from the trapezoidal wave generator 35. The phase comparison error output which is sampled and held in the phase comparator 36, is supplied to the mixing amplifier 29 through the switch 28. Hence, the phase comparison error output from the phase comparator 36 and the voltage signal from the F/V converter 31, are mixed in the mixing amplifier 29. The output signal of the mixing amplifier 29 is supplied to the drum motor 16, to control the rotation of the drum motor 16. The servo operation described heretofore, is the same as the servo operation which was conventionally carried out.

A frequency generator 48 is provided in the capstan motor 44. A signal having a frequency of 720 Hz, for example, which is in accordance with the rotational speed of the capstan motor 44, is produced from the frequency generator 48. This output signal of the frequency generator 48 is supplied to a frequency divider 50 and to a variable frequency generator 51, through an amplifier 49. The signal which is supplied to the frequency divider 50 is frequency-divided by 1/24, and formed into a sampling pulse h shown in FIG. 2(H). This sampling pulse h has a frequency of 30 Hz, and is supplied to a phase comparator 53 through the switch 52.

On the other hand, the monostable multivibrator 59 which is supplied with the frequency-divided signal e from the frequency divider 39, produces the signal i shown in FIG. 2(I). This signal i is supplied to a trapezoidal wave generating circuit 60 which converts the signal i into a trapezoidal wave j shown in FIG. 2(J). This trapezoidal wave j is supplied to the phase comparator 53. The sampling pulse h which is supplied to the phase comparator 53, samples and holds the voltage at a sloping part of the trapezoidal wave j. An output phase comparison error signal of the phase comparator 53, which was subjected to the sampling and holding in the phase comparator 53, is supplied to a mixing amplifier 55.

The frequency dividing ratio of the variable frequency divider 51, is set to 1/6 by a recording mode signal which is applied to the variable frequency divider through a terminal 61. Hence, the frequency of the signal which is supplied to the variable frequency divider 51 from the amplifier 49, is frequency-divided by 1/6. An output signal of the variable frequency divider 51, which has a frequency of 120 Hz, is supplied to a frequency-to-voltage (F/V) converter 54 wherein the signal is converted into a voltage which is in accordance with the frequency of the signal. The output voltage of the F/V converter 54 is supplied to the mixing amplifier 55 wherein this output voltage is mixed with the output signal of the phase comparator 53. An output signal of the mixing amplifier 55 is supplied to the capstan motor 44, to control the rotation of the capstan motor 44.

A recording video signal which is to be recorded, is supplied to the rotary heads 15a and 15b, through an amplifier 46 and the switch 47. This recording video signal is recorded onto oblique tracks on the magnetic tape 11 which is driven to travel under the control of the capstan motor 44 which is rotationally controlled as described heretofore, by the rotary heads 15a and 15b which are rotated by the drum motor 16 which is rotationally controlled as described heretofore.

Next, description will be given with respect to the operation of the block system shown in FIG. 1 during a normal reproducing mode. During the normal reproducing mode, the switches 28 and 37 are respectively connected to the contacts N, and the switches 47 and 52 are respectively connected to contacts P. The operation of the servo system with respect to the drum motor 16, is identical to the operation carried out during the recording mode.

The video signal which is reproduced from the traveling magnetic tape 11 by the rotary heads 15a and 15b, is supplied to a demodulator 23 through the switch 47 and an amplifier 22, and demodulated in the demodulator 23. The demodulated output signal of the demodulator 23, is supplied to a television receiver through a terminal 24.

A control pulse signal k shown in FIG. 2(K), is reproduced from a control track on the traveling magnetic tape 11 by a control head 56. This control pulse signal k is supplied to a variable frequency divider 58 through an amplifier 57. During the normal reproducing mode, the frequency dividing ratio of the variable frequency divider 58 is set to 1 by a reproducing mode signal which is applied to the variable frequency divider 58 through a terminal 61. This means that the variable frequency divider 58 does not carry out a frequency-dividing operation during the normal reproducing mode. The variable frequency divider 58 produces a pulse 1 shown in FIG. 2(L), in correspondence with a positive polarity pulse in the control pulse signal k. The pulse 1 is supplied to the phase comparator 53 as a sampling pulse, through the switch 52. The sampling pulse 1 samples the trapezoidal wave j which is produced from the trapezoidal wave generating circuit 60. The output signal of the phase comparator 53 is supplied to the mixing amplifier 55 wherein the output signal of the phase comparator 53 is mixed with the output signal of the F/V converter 54. The normal reproducing mode signal is applied to the variable frequency divider 51 through the terminal 61 during the normal reproducing mode, and the frequency dividing ratio of the variable frequency divider 51 is set to 1/6 which is the same as the frequency dividing ratio during the recording mode. The output signal of the mixing amplifier 55 is supplied to the capstan motor 44, to control the rotation of the capstan motor 55.

Therefore, the pickup head 20, the amplifiers 32a and 32b, the monostable multivibrators 33a and 33b, the flip-flop 34, the trapezoidal wave generating circuit 35, the phase comparator 36, the oscillator 38, the frequency divider 39, the monostable multivibrator 40, the pulse generator 41, and the mixing amplifier 29, constitute a rotational phase control loop of the servo system with respect to the drum motor 16. In addition, the frequency generator 21, the amplifier 30, the F/V converter 31, and the mixing amplifier 29 constitute a rotational speed control loop of the servo system with respect to the drum motor 16. On the other hand the frequency generator 48, the amplifier 49, the frequency divider 50, the control head 56, the amplifier 57, the variable frequency divider 58, the oscillator 38, the frequency divider 39, the monostable multivibrator 59, the trapezoidal wave generating circuit 60, the phase comparator 53, and the mixing amplifier 55, constitute a rotational phase control loop of the servo system with respect to the capstan motor 44. Moreover, the frequency generator 48, the amplifier 49, the variable frequency divider 51, the F/V converter 54, and the mixing amplifier 55, constitute a rotational speed control loop of the servo system with respect to the capstan motor 44.

Therefore, during the recording mode and the normal reproducing mode of the magnetic reproducing apparatus, the rotations of the drum motor 16 and the capstan motor 44 are respectively in phase with the reference signal e which is obtained by frequency-dividing the output reference signal d of the reference signal oscillator 38 in the frequency divider 39. For this reason, the rotation of the drum motor 16 and the rotation of the capstan motor 44 are in phase.

Next, description will be given with respect to the operation of the block system shown in FIG. 1 during a high-speed search reproducing mode. During the high-speed search reproducing mode, the switches 28 and 37 are respectively connected to contacts H, and the switches 47 and 52 are respectively connected to the contacts P. A voltage for high-speed search reproducing mode is applied to a capstan motor 44 through a terminal 62, to rotate the capstan motor 44 at a high speed. As a result, the magnetic tape 11 travels at a high-speed which is approximately seven times the tape traveling speed upon normal reproduction. During this high-speed search reproducing mode, it is also possible to cause the magnetic tape 11 to travel at a high speed, by separating the pinch roller 43 from the capstan 42 and taking up the magnetic tape 11 by rotating a take-up reel or a supply reel.

The video signal which is reproduced from the traveling magnetic 11 by the rotary heads 15a and 15b, is supplied to the demodulator 23 through the switch 47 and the amplifier 22, and demodulated in the demodulator 23. The demodulated output of the demodulator 23 is obtained through the terminal 24, and supplied to a television receiver. On the other hand, the above demodulated output is also supplied to a horizontal synchronizing signal separating circuit 25 wherein a horizontal synchronizing signal is separated. The separated horizontal synchronizing signal is supplied to a frequency-to-voltage (F/V) converter 26 and converted into a voltage which is in accordance with the frequency of the separated horizontal synchronizing signal. An output voltage of the F/V converter 26 is applied to the contact H of the switch 28, through an amplifier 27. Because the switch 28 is connected to the contact H, the above output voltage of the F/V converter 26 is supplied to the mixing amplifier 29 and mixed with the voltage signal from the F/V converter 31. The output signal of the mixing amplifier 29 is supplied to the drum motor 16, to control the rotational speed of the drum motor 21. The above loop constitutes the speed control loop.

Accordingly, the rotational speed and the rotational phase of the drum motor 16 are controlled so that a relative scanning linear speed between the rotary heads 15a and 15b and the tracks on the magnetic tape 11 which travels at a speed higher than the tape traveling speed upon normal reproduction, becomes equal to the relative scanning linear speed upon normal reproduction. When the magnetic tape 11 is caused to travel in the direction of the arrow X which is the same as the direction of tape travel upon normal reproduction, the rotational speed of the drum motor 16 is controlled to become higher than the rotational speed upon normal reproduction. On the other hand, if the magnetic tape 11 is caused to travel in a direction opposite to the direction of the arrow X, the rotational speed of the drum motor 16 is controlled to become lower than the rotational speed upon normal reproduction.

On the other hand, a square wave is produced from the flip-flop 34 according to the phase detection signal a which is detected by the pickup head 20, similarly as in the other modes described previously. This square wave which is produced from the flip-flop 34, is supplied to the trapezoidal wave generating circuit 35. Further, this square wave is also supplied to a reset terminal of the frequency divider 39 which comprises a counter, through the switch 37 which is connected to the contact H. The reference signal d which has a frequency of 32 kHz and is produced from the reference signal oscillator 38, is frequency-divided into a signal having a frequency of 30 kHz in the frequency divider 39. Because the frequency divider 39 is reset by the signal b, the frequency divider 39 produces the frequency divided signal e shown in FIG. 2(E) which falls in synchronism with a trailing edge of the signal b. Accordingly, the signal e is in phase with the signal b.

The above signal e is supplied to the monostable multivibrators 40 and 59. The output signal i of the monostable multivibrator 59 is in phase with the signal e, and the output signal j of the trapezoidal wave generating circuit 60 is in phase with the signal i. Hence, the signal j continues to be in phase with the signal b. The signal j is supplied to the phase comparator 53.

On the other hand, a high-speed search reproducing mode signal is applied to the variable frequency dividers 51 and 58, through the terminal 61. Thus, the frequency dividing ratio of the variable frequency divider 51 is set to 1/42, and the frequency dividing ratio of the variable frequency divider 58 is set to 1/7. Consequently, the output signal of the frequency generator 48, which is in accordance with the rotation of the capstan motor 44 which is rotated at the rotational speed which is approximately seven times the rotational speed upon normal reproduction, is frequency-divided by 1/42 in the variable frequency divider 51. As a result, a signal having a frequency of 120 Hz which is the same as the signal obtained during the recording and normal reproducing modes, is produced from the variable frequency divider 51.

In addition, the control pulse reproduced by the control head 56, which has a frequency which is seven times the frequency of the reproduced control signal upon normal reproduction, is frequency-divided by 1/7 in the variable frequency divider 58. Hence, the variable frequency divider 58 produces a sampling pulse l which is the same as the sampling pulse obtained during the normal reproducing mode. This sampling pulse l is supplied to the phase comparator 53. This sampling pulse l samples the trapezoidal wave j from the trapezoidal wave generating circuit 60, in the phase comparator 53. As described before, the trapezoidal wave j is in phase with the signal b. The output signal of the phase comparator 53 is supplied to the mixing amplifier 55 and mixed with the output signal of the F/V converter 54. The output signal of the mixing amplifier 55 is supplied to the capstan motor 44, to control the rotational speed and the rotational phase of the capstan motor 44.

Accordingly, during the high-speed search reproducing mode, the rotation of the capstan motor 44 is controlled by a control signal which is formed by using the trapezoidal wave j which is in phase with the signal b which is obtained from the rotation detection signal a of the drum motor 16, and the signal l which is obtained from the reproduced control signal. For this reason, the capstan motor 44 and the drum motor 16 rotate perfectly in phase with each other during the high-speed search reproducing mode, as in the case of the recording and normal reproducing modes. Thus, the noise bar which is generated in the reproduced picture during the high-speed search reproducing mode when the scanning locus of the rotary head 15a or 15b deviates from the intended track and the rotary head 15a or 15b scans over an adjacent track together with the intended track, and further scans obliquely across the adjacent track, constantly appears at a constant position in the reproduced picture. Hence, the noise bar in the reproduced picture remains still, and will not move upward or downward as in the case of the conventional magnetic reproducing apparatus. Therefore, the noise bar in the reproduced picture will not be irritating to the eyes of the viewer because the noise bar is still.

During the high-speed search reproducing mode, the frequency-divided signal e and the signal b are in phase as described above, even immediately before the mode is switched over to the normal reproducing mode from the high-speed search reproducing mode. Further, the phase relationship between the trapezoidal wave c and the sampling pulse g which are supplied to the phase comparator 36, is the same as the phase relationship between the trapezoidal wave c and the sampling pulse g in a state where the head servo circuit is locked during the normal reproduction. Accordingly, when the connections of the switches 28 and 37 are switched over to the respective contacts N from the contacts H as the mode is switched over to the normal reproducing mode from the high-speed search reproducing mode, the head servo circuit becomes locked in with respect to the drum motor 16 instantaneously or within an exceedingly short period of time. Therefore, horizontal synchronism is continuously maintained in the reproduced picture which is obtained in the television receiver when the mode is switched over to the normal reproducing mode from the high-speed search reproducing mode. As a result, inconveniences such as an irregular picture which is obtained according to conventional magnetic reproducing apparatus because the horizontal synchronism cannot be maintained during the above switching of the mode, are prevented from occurring in the magnetic reproducing apparatus according to the present invention.

In addition, during the normal reproducing mode, the rotation of the drum motor 16 and the rotation of the capstan motor 44 are independently in phase with the square wave e which is used as the reference signal. Thus, the unstable rotation of the drum motor 16 will not affect the rotation of the capstan motor 44.

Further, the present invention is not limited to these embodiments, but various variations and modifications may be made without departing from the scope of the present invention.

What is claimed is:

1. A magnetic reproducing apparatus having a capstan servo circuit, said reproducing apparatus comprising rotary heads for reproducing a recorded video signal from tracks which are formed obliquely to the longitudinal direction of a magnetic tape, a drum motor for rotating said rotary heads, and a capstan motor for rotating a capstan which drives said magnetic tape to travel, said capstan servo circuit comprising:

detecting means for detecting a rotation of said drum motor, and for producing a detection signal which is in accordance with the rotation of said drum motor;

reference signal generating means for generating a reference signal;

synchronizing means for synchronizing the phase of the reference signal which is generated from said reference signal generating means and the phase of the detection signal which is produced from said detecting means during a high-speed reproducing mode of said reproducing apparatus;

a control head for reproducing a recorded control signal from said magnetic tape;

phase comparing means for comparing the phase of the control signal which is reproduced by said control head with the phase of the reference signal which is generated from said reference signal generating means, and for producing an output signal; and control means for controlling a rotation of said capstan motor by the output signal of said phase comparing means.

2. A magnetic reproducing apparatus as claimed in claim 1 in which said reference signal generating means comprises a reference oscillator for producing a signal having a predetermined frequency, and a frequency divider reset by a reset signal, for frequency-dividing the output signal of said reference oscillator, and said synchronizing means supplies the detection signal from said detecting means to said frequency divider as said reset signal only during the high-speed reproducing mode of said reproducing apparatus.

3. A magnetic reproducing apparatus as claimed in claim 2 in which said frequency divider comprises a counter which is reset of its counting operation by the detection signal from said detecting means.

4. A magnetic reproducing apparatus as claimed in claim 1 in which said capstan servo circuit further comprises a variable frequency divider, said variable frequency divider having a frequency dividing ratio which is variably set so that the frequency of the control signal which is reproduced by said control head during the high-speed reproducing mode is equal to the frequency of the control signal which is reproduced by said control head during a normal reproducing mode of said reproducing apparatus.

5. A magnetic reproducing apparatus as claimed in claim 1 which further comprises another phase comparing means for comparing the phase of the reference signal from said reference signal generating means and the phase of the detection signal from said detecting means, and for producing and output signal, another control means for controlling the rotation of said drum motor by the output signal of said other phase comparing means during modes other than the high-speed reproducing mode, and cut-off means for cutting off supply of the output signal of said other phase comparing means to said other control means during the modes other than the high-speed reproducing mode.

6. A magnetic reproducing apparatus as claimed in claim 4 in which said capstan servo circuit further comprises a frequency generator for generating a signal having a frequency which is in accordance with the rotation of said capstan motor, another variable frequency divider for frequency-dividing the output signal of said frequency generator, said other variable frequency divider having a frequency dividing ratio which is variably set so that the frequency of a frequency-divided signal which is produced from said other variable frequency divider is the same during the normal reproducing mode and the high-speed reproducing mode, and means for subjecting the frequency-divided signal from said other variable frequency divider to a frequency-to-voltage conversion, and for supplying a voltage signal to said control means.

* * * * *